United States Patent [19]

Rajput et al.

[11] 4,130,323
[45] Dec. 19, 1978

[54] TANDEM CONTROL BRAKE SYSTEM

[75] Inventors: Yudh V. Rajput, Dayton; Carl A. Couchot, Piqua, both of Ohio

[73] Assignee: The B. F. Goodrich Company, Akron, Ohio

[21] Appl. No.: 817,459

[22] Filed: Jul. 19, 1977

[51] Int. Cl.² .............................................. B60T 8/02
[52] U.S. Cl. ................................. 303/106; 188/181 A; 303/97; 303/111
[58] Field of Search ...................... 188/181 A, 181 C; 303/20, 96, 97, 106, 111, 93, 105; 340/53, 62; 361/238

[56] References Cited

U.S. PATENT DOCUMENTS

| | | | |
|---|---|---|---|
| 3,245,727 | 4/1966 | Anderson et al. | 303/97 X |
| 3,583,773 | 6/1971 | Steinbrenner et al. | 303/96 |
| 3,597,011 | 8/1971 | Clifford | 303/97 |
| 3,608,979 | 9/1971 | Coyle | 303/20 X |
| 3,682,512 | 8/1972 | Malon et al. | 303/20 |
| 3,767,270 | 10/1973 | Urban | 303/20 X |
| 3,847,446 | 11/1974 | Scharlack | 303/96 |
| 3,880,475 | 4/1975 | Booher | 303/20 X |
| 3,917,356 | 11/1975 | Devlieg | 303/93 |

Primary Examiner—Stephen G. Kunin
Attorney, Agent, or Firm—Harry F. Pepper, Jr.

[57] ABSTRACT

In an anti-skid brake control system for overriding manual operation of the brakes of a vehicle having plural wheels on each of plural tandem axles, the rotational speed characteristics of each of those wheels simultaneously are monitored on an axle by axle and individual basis. When the wheels on either axle encounter an incipient or actual skid or any wheel encounters a locked condition, the system dumps a percentage, from part to all, of the brake operating fluid pressure then being requested by the vehicle operator. Appreciating that each axle of a tandemly spaced pair of axles, including the load transfer characteristics on such axle, acts individually, the present invention provides a deceleration summing circuit to monitor the deceleration characteristics of the plural wheels on respective axles. Moreover, all of the plural wheels on the tandem axles are monitored by a single wheel lock detector circuit and a single low speed control circuit. The tandem control brake system, accordingly, provides anti-skid brake control operation for the wheels on such tandem axles with improved performance characteristics and cost reduction over past techniques.

15 Claims, 2 Drawing Figures

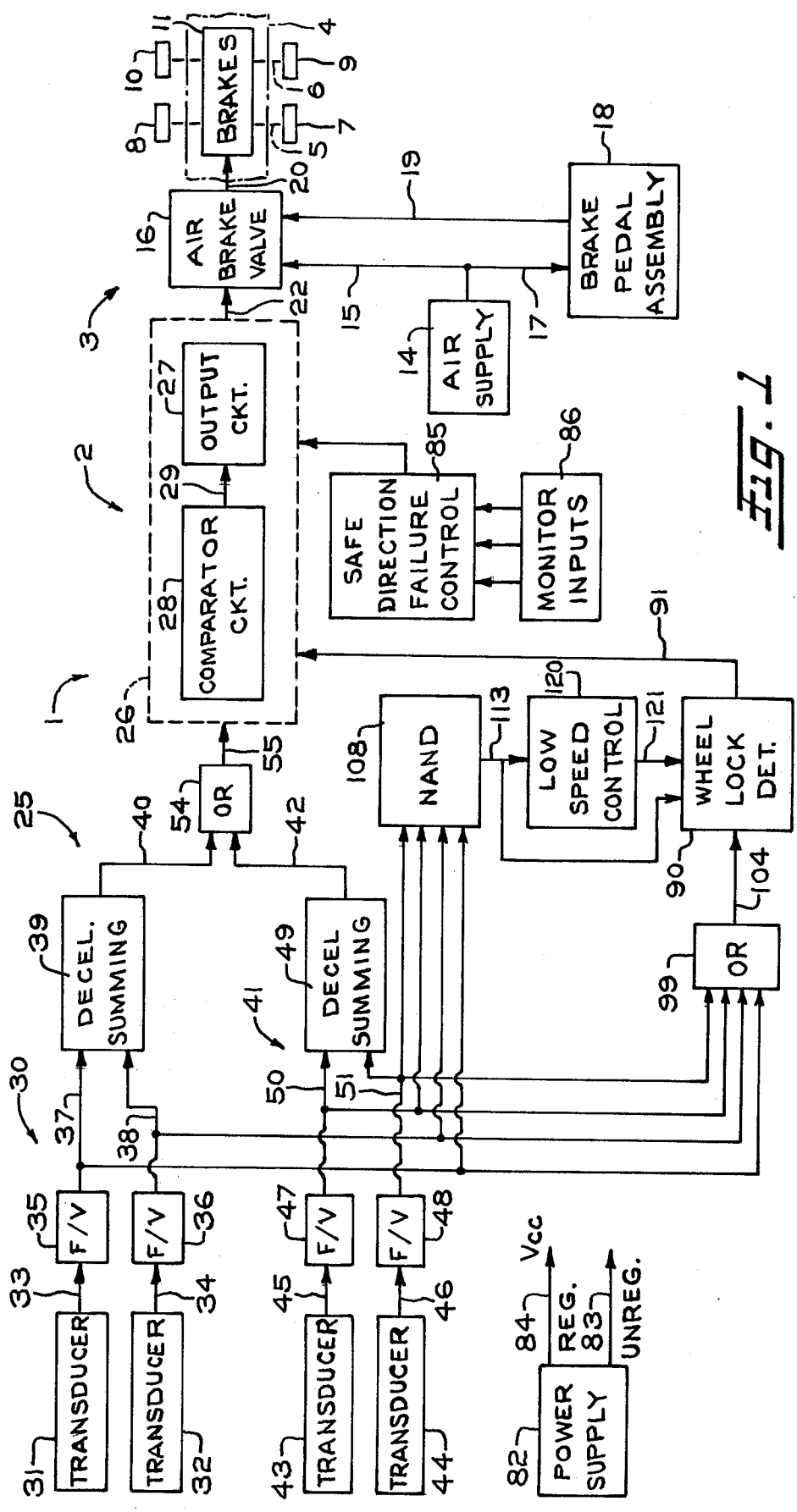

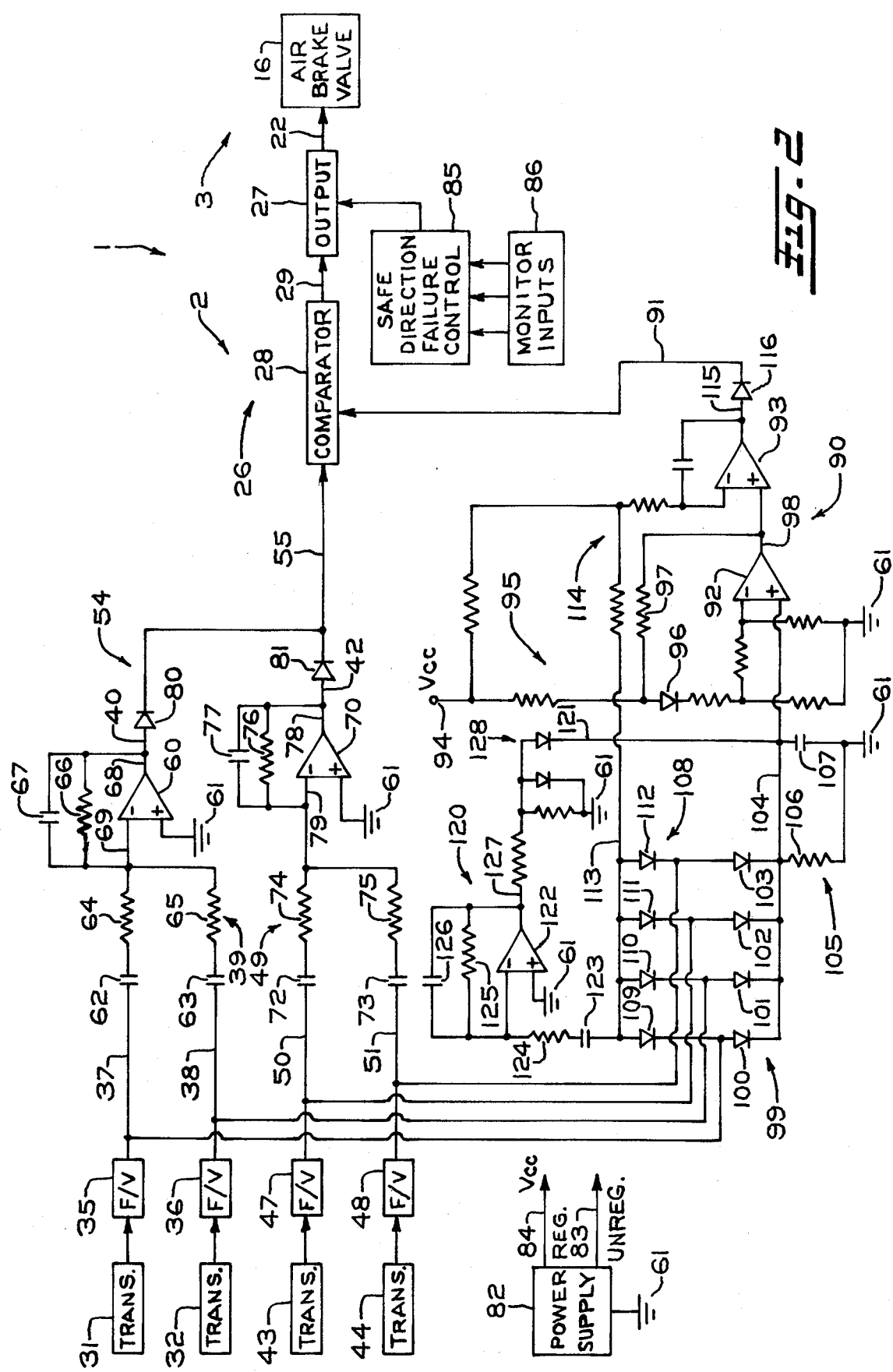

TANDEM CONTROL BRAKE SYSTEM

BACKGROUND OF THE INVENTION

The present invention relates generally, as indicated, to anti-skid brake control systems for vehicles having tandemly spaced axles and, more particularly, to such a system that combines the advantages of an axle-by-axle monitoring technique with common controller circuitry and valving.

Anti-skid brake control systems are shown in U.S. patent applications Ser. No. 685,267, filed May. 11, 1976, now U.S. Pat. No. 4,040,676, issued Aug. 9, 1977 for "Anti-Skid Brake Control System With Short Circuit Protection"; Ser. No. 769,255, filed Feb. 16, 1977 for "Anti-Skid Brake Control System With Power-Up Delay"; Ser. No. 779,205, filed Mar. 18, 1977, for "Capacitive Shunt To Minimize Noise Effects In An Anti-Skid Brake Control System"; and Ser. No. 770,535, filed Feb. 22, 1977, for "Anti-Skid Brake Control System With Circuitry for Monitoring Slower Wheel." All of these applications and the present application are co-pending and commonly assigned. As is disclosed in those applications, it is the principal purpose of an anti-skid brake control system to provide automatic overriding control of the brakes of a vehicle when an incipient or actual skid or a locked wheel condition exists. Upon detecting such condition, the system dumps part or all (hereinafter a percentage) of the brake operating fluid pressure (hereinafter air pressure) which the vehicle operator then may be requesting or attempting to apply manually by pressing on the vehicle brake pedal with his foot.

In past systems a conventional transducer detected the rotational speed of a vehicle wheel and produced an AC transducer signal having a frequency representative of the wheel speed. A frequency to voltage converter produced a DC voltage having an amplitude indicative of the frequency of the transducer signal and, thus, representative of the wheel speed. A deceleration detector circuit, such as a conventional differentiating circuit, detected the rate of downward change of the DC voltage, as an indication of the magnitude of wheel deceleration, and if that deceleration exceeded a predetermined threshhold amount indicative of an incipient or actual skid condition of the wheel, the system was operative to dump a percentage of the air pressure. If a wheel were to lock, for example, whereupon there would be no further deceleration thereof, a wheel lock detector detected the same and continued the pressure dump.

In some early systems a separate transducer, frequency to voltage converter, deceleration detector, wheel lock detector, output circuitry that determined the magnitude or percentage of the pressure dump, air brake modulator valve mechanism, and associated plumbing connections were required to provide anti-skid brake control function for each individual wheel of the vehicle. However, as is disclosed in the last application mentioned above, the system may operate on an axle by axle basis using a single electronic controller to monitor the deceleration of the more slowly rotating one of at least two wheels. In the latter anti-skid brake control system separate transducers and frequency to voltage converters were required for each wheel; but only single deceleration detector, wheel lock detector, and output circuits were required in the controller, and only one valve was necessary for both wheels on the given axle.

Moreover, as is also disclosed in the last application mentioned above, the output circuitry may include a comparator that monitors the magnitudes of the deceleration signal from the deceleration circuit and the output signal from the wheel lock detector circuit and depending on such magnitudes determines whether an also included output circuit energizes one, the other, or both of a pair of solenoids in the air brake valve to modulate the air pressure, i.e. to dump different respective percentages of the air pressure then requested by the operator. One particular type of suitable air brake valve is disclosed in a brochure entitled "Triple Action Skid Control", published by B. F. Goodrich Company, March, 1975. Such valve includes a pair of solenoids that may be selectively energized by the system to dump one third, two thirds, or all of the air pressure being requested by the vehicle operator. When neither solenoid is energized, all of the requested air pressure is delivered to the air brakes. A safe direction failure control circuit having one or more inputs coupled to respective portions of the anti-skid brake control system, for example, as is disclosed in the above-mentioned applications, monitors those portions of the system and disables the latter when a fault or the like is sensed, thus returning full manual control of the brakes to the vehicle operator.

In the past, a deceleration summing technique was used in an anti-skid brake control system to improve the stop distance efficiency of the vehicle without loss of stability when the vehicle was riding on a surface having split mu conditions.

Other anti-skid brake control systems are disclosed in U.S. Pat. Nos. 3,917,359, which employs conventional magnetic pickups or transducers for generating signals representing the rotational speed of the wheels of the vehicle, and 3,847,446, which is directed to a system for tandem axle vehicles. In the latter patent, a pair of tandemly spaced wheels on one side of the vehicle are simultaneously monitored and controlled, i.e. have dumped a percentage of the air pressure requested by driver when an incipient or actual skid is detected. A similar anti-skid brake control system is provided for the pair of tandemly spaced wheels on the opposite side of the vehicle. Of the several embodiments shown in such patent, including those in which both wheels must skid to effect a pressure dump, only the forwardly located wheel must skid to effect a pressure dump, or either wheel must skid to effect a pressure dump, control is effected only on a side-by-side basis of the vehicle. Moreover, in the majority of embodiments in such patent in which the speeds of both wheels on one side of the vehicle are monitored simultaneously, separate deceleration detector circuits are required for each wheel; and in one embodiment signals representing the speeds of two wheels on separate axles on one side of the vehicle are averaged and a single deceleration detector circuit detects the magnitude of the deceleration of the average speed of the pair of wheels.

SUMMARY OF THE INVENTION

In accordance with the present invention, one discovery that the load transfer on tandemly spaced axles of a vehicle during braking thereof effects each axle individually and another discovery that empirically better response, i.e. shorter controlled braking distances, is obtained, when split mu conditions are encountered, by monitoring the wheels on both sides of a common axle using an anti-skid brake control system employing the mentioned deceleration summing technique, are combined. As a result, only a single electronic controller, including respective frequency to voltage converters for converting the respective transducer signals for each wheel to useful DC voltages but only one deceleration circuit for each axle and only single wheel lock detector and output circuits and modulating air brake valve for all four wheels on both axles, for example, is required for effective anti-skid brake control function. Thus, the number of individual electrical circuits, and associated plumbing and the like for effecting anti-skid brake control of the plural wheels on tandemly spaced axles (hereafter tandem axles) are appreciably reduced relative to the parts required in prior art systems while improved performance and/or reliability and significant cost reductions are obtained.

The deceleration summing technique monitors simultaneously the plural wheels on opposite sides of a common axle and provides an output signal which is proportional to the sum of the derivative of the independent DC voltages representative, respectively, of the individual wheel speeds by using a common deceleration differentiating circuit. The output deceleration signal from such common deceleration differentiating circuit operates the output circuitry to dump a percentage of the air pressure requested by the operator when the differentiated sum exceeds a predetermined magnitude indicative of an incipient or actual skid condition. It has been found that the use of such deceleration summing type of circuitry, particularly to monitor the deceleration of plural wheels on opposite sides of a common axle, provides advantageously improved stop distance efficiency without loss of stability when the vehicle is riding on a surface having split mu conditions. The mu condition is the friction co-efficient exhibited by the surface to a wheel, and a split mu condition occurs, for example, when the wheel or wheels on one side of the vehicle encounter a different surface frictional characteristic than the wheel or wheels on the other side of the vehicle are encountering.

Summarizing, then, the tandem control brake system in accordance with the invention uses respective deceleration summing circuits, one for each of a pair of tandem axles, thus maintaining axle by axle individuality, and in response to excessive deceleration at either axle the system dumps a percentage of the requested air pressure. By using a combination of OR and NAND gates the tandem control brake system needs only a single wheel lock detector circuit, and a separate single low speed control circuit enables such lock detector to detect a locked wheel, even when the wheels are rotating at a relatively low speed, to cause a pressure dump.

With the foregoing in mind, it is a primary object of the invention to provide an improved anti-skid brake control system for tandem vehicles.

Another object is to increase the reliability of an anti-skid brake control system or the like.

An additional object is to reduce the number of electrical and mechanical parts required in an anti-skid brake control system or the like to effect overriding control of plural wheels of a vehicle.

A further object is to improve the performance and at the same time to reduce the cost of an anti-skid brake control system for tandem vehicles.

Still another object is to simplify the construction and parts of an anti-skid brake control system while at the same time increasing the number of vehicle wheels with which such system is operatively coupled for controlling purposes as aforesaid.

The foregoing objects and advantages may be achieved, for example, in vehicles, such as trucks, having three or more axles, wherein the forward-most axle usually is the only single one and the remaining axles are arranged in tandem pairs, by using a single anti-skid brake control system to control the wheels on opposite sides of the forward-most axle and to control the remaining wheels on respective tandem axle pairs by using respective tandem control brake systems in accordance with the present invention. Such arrangement of anti-skid brake control systems on a vehicle will assure stable braking in satisfactory distances with maximum efficiency and reliability and relatively minimum expense.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a schematic block diagram illustrating a tandem control brake system in accordance with the invention operatively coupled to the air brake system of a vehicle; and FIG. 2 is a schematic electric circuit diagram, partly in block form, illustrating in more detail the deceleration summing circuits and the wheel lock detector and low speed detector circuits of the tandem control brake system of FIG. 1.

DESCRIPTION OF THE PREFERRED EMBODIMENT

Referring now more particularly to the drawings, and initially to FIG. 1, a tandom control brake system in accordance with the invention is generally indicated at 1. The system 1 is in effect an anti-skid brake control system 2 that is operatively coupled to the air brake system 3 of a vehicle 4 for effective overriding control of the air brake system when an incipient or actual skid condition or a locked wheel condition is detected. The vehicle 4 preferably is a tandem vehicle, i.e. it has a pair of tandem axles 5, 6 mounted in parallel and relatively closely spaced-apart locations on the vehicle, as is well known. Each tandem axle 5 and 6 has at least one pair of wheels 7, 8 and 9, 10, respectively mounted thereon and associated with each wheel is a respective conventional air brake grouped together at 11. Although the invention will be described hereinafter with reference to such a vehicle that has on each axle a pair of wheels with one wheel on each side of the vehicle, it will be appreciated that the invention may be used in those situations where more than two wheels are mounted on each axle or where the axles are relatively far apart.

In the air brake system 3, a primary supply of air pressure from the vehicle air supply 14 is provided via a fluid connection 15 to a conventional modulator air brake valve 16, such as the one mentioned above, and via a fluid connection 17 to the brake pedal assembly 18. The vehicle operator may manually operate the brake pedal by his foot, for example, to determine the amount of control air pressure supplied via fluid line 19 to the air brake valve 16 to open the latter a corresponding amount, thereby to provide a controlled amount of brake operating primary air pressure delivered via the fluid line 20 to each of the four vehicle air brakes 11 to operate such air brakes to slow the vehicle in conventional manner.

As was noted above, the purpose of the anti-skid brake control system 2 portion of the tandem control brake system 1 is to override manual control of the air brake system 3 when an incipient or actual skid or a locked wheel condition has been detected. Accordingly, the air brake valve 16 includes a modulator valve portion, not shown, for example of conventional solenoid operated type, that dumps a percentage of the air pressure being requested or called for by the vehicle operator in response to a dump signal delivered on the electrical output 22 of the system 2. Such dump signal energizes one or more solenoids in modulator portion of the air brake valve 16 to dump a percentage of the air pressure requested by the operator, thereby allowing the skidding wheel or wheels to regain traction with the road or other surface over which the vehicle is moving. Although one type of modulator air brake valve is mentioned above, it will be appreciated that other types may be similarly employed. Ordinarily the system 2 is operative to stop producing such dump signal after the monitored vehicle wheels have regained traction, whereupon the full air pressure requested by the vehicle operator again would be delivered to the brakes 11.

The tandem control brake system 1 includes a detector portion 25, which detects the actual speed condition of the vehicle wheels monitored, and a control portion or output circuitry 26, which effect production of the dump signal on the electrical output 22 depending on certain wheel conditions detected by the detector portion. More particularly, the control portion 26 includes output circuit 27, which produces respective dump signals on the electrical output 22 to operate the respective solenoids of the air brake valve 16, and a comparator circuit 28, which controls the output circuit. Depending on the magnitude of the electrical input to the comparator circuit 28 from the detector portion 25, the comparator circuit will produce a signal on line 29 causing the output circuit 27 to produce no dump signal or to produce a dump signal that will effect dumping, for example, of one-third two-thirds or all of the air pressure being called for by the operator. A more detailed description of the control portion 26 is presented in the co-pending, last patent application mentioned above.

In the detector portion 25 a first detector circuit 30 has a pair of conventional transducers 31, 32, which monitor the respective rotational speeds of the two wheels, 7, 8, for example, on opposite sides of the vehicle 4 on one axle 5 of the two tandem axles and produce on respective lines 33, 34 AC transducers signals having frequencies representative of such speeds. A pair of conventional frequency to voltage converter circuits 35, 36 produce on lines 37, 38 respective DC voltages that have amplitudes proportionally representative of the respective wheel speeds, and a deceleration summing circuit 39 produces on line 40 a first deceleration signal that effectively represents the combined decelerations of the two wheels 7, 8 monitored by the transducers 31, 32.

A second detector circuit 41 also is included in the detector portion 25 to produce on line 42 a second deceleration signal representing the combined decelerations of the plural wheels 9, 10 mounted on the other of the tandem axles 6. Accordingly, the second detector circuit 41 includes a pair of conventional transducers 43, 44 coupled by lines 45, 46 to respective frequency to voltage converters 47, 48, and a second deceleration summing circuit 49 connected by lines 50, 51 to the respective frequency to voltage converters. The several parts of the second detector circuit 41 are similar to and operate in the same manner as those described above in the first detector circuit 30.

Thus, the deceleration summing circuits 39, 49 monitor downward changes of the respective combined DC voltages representing the speeds of the wheels 7–10 mounted on respective tandem axles 5, 6 and produce the respective first and second deceleration signals that have magnitudes representing the rates of such downward changes and, thus, the deceleration of respective wheels. An OR gate 54 delivers via line 55 the larger of the two deceleration signals to the control portion 26. When the magnitude of the deceleration signal on line 55 is below a predetermined threshold level set or biased in the comparator circuit 28, no output will be produced on line 29, and the output circuit 27 will not produce a dump signal. At that time the air brake system 3 will be fully under manual control of the vehicle operator. However, if the magnitude of the deceleration signal on line 55 exceeds a first, a second, or a third predetermined threshold level or amplitude, the comparator circuit 28 will produce on line 29 a signal that causes the output circuit 27 to produce a dump signal that energizes a first, a second, or both, respectively, of the solenoids in the air brake valve 16 to dump one-third, two-thirds, or all, respectively, of the air pressure then requested by the operator.

Accordingly, if the vehicle wheels decelerate in normal manner under normal braking conditions, the value of the deceleration signal on line 55 will be below that required to produce a dump signal and the operator will have full control of the air brake system 3. However, if the vehicle is undergoing a small, medium, or large skid or incipient skid represented by small, medium, or large deceleration signals indicating a small, medium, or large combined deceleration of the wheels on one of the tandem axles, one-third, two-thirds, or all of the air pressure being called for by the operator will be dumped.

Turning now briefly to FIG. 2, it will be seen that the deceleration summing circuit 39 is in effect a summing junction and an accurate differentiator circuit. More particularly, the deceleration summing circuit 39 includes a conventional operational amplifier 60, which has its non-inverting input coupled to a source of relative ground potential for the system 2, as represented at 61, and its inverting input coupled to receive the respective DC voltages from lines 37, 38 via respective series connected capacitors 62, 63 and resistors 64, 65. Feedback resistor 66 and capacitor 67 are connected between the amplifier output 68 and the inverting input 69. In effect the capacitors 62, 63 cooperate with the feedback resistor 66 and the amplifier 60 to differentiate the respective DC voltages on lines 37, 38 thereby to provide the first deceleration signal on line 40 representing the combined decelerations of the plural wheels on one of the tandem axles.

As is illustrated in FIG. 2, the second deceleration summing circuit 49 includes amplifier 70, capacitors 72, 73, resistors 74, 75, feedback resistor 76 and capacitor 77, amplifier output 78 and inverting input 79, which correspond structurally and functionally to those parts described above with reference to the first deceleration summing circuit 39.

The OR gate 54 includes the diodes 80, 81 connected, respectively, via lines 40, 42 to the outputs 68, 78 of the amplifiers 60, 70 and via line 55 to the input of the comparator circuit 28.

Thus, in view of the foregoing, it will now be clear that the first and second deceleration signals delivered on lines 40, 42 to the diodes 80, 81 of the OR gate 54 will represent the combined decelerations of the plural wheels on the respective tandem axles. Moreover, when either one of those deceleration signals exceeds a predetermined level, as determined by the comparator 28, the latter will be operative to cause the output circuit 27 to produce a dump signal on line 22, thereby dumping a percentage of the air pressure then being requested by the vehicle operator.

A conventional power supply circuit generally shown at 82 may be employed to provide an unregulated DC voltage on line 83 and a regulated $V_{cc}$ voltage on line 84 relative to the circuit ground potential 61 to energize the respective parts of the tandem control brake system 1 in conventional manner. Moreover, a safe direction failure control circuit 85, for example, as is described in the above co-pending applications, is coupled via one or more monitor inputs represented at 86 to monitor the operability of, for example, the transducers 31, 32, 43, 44 and/or other portions of the tandem control brake system 1. As is disclosed in those applications, the safe direction failure control 85 ordinarily is operative to disable the anti-skid brake control system 2 from producing a dump signal whenever a fault in one of the monitored portions has been detected. Therefore, when such a fault has been detected, full manual control of the air brake system 3 is returned to the vehicle operator.

A wheel lock detector circuit 90 (FIGS. 1 and 2) monitors all of the DC voltages on lines 37, 38, 50 and 51 representing the rotational speeds of the respective wheels and produces a wheel locked signal on line 91 that causes the control portion 26 to produce a dump signal when a locked wheel condition is detected. More particularly, such a locked wheel condition will be detected by the wheel lock detector 90 when the speed of at least one of the monitored wheels drops below a predetermined minimum speed, say 8 miles per hour, while at least one of the other monitored wheels exceeds a predetermined speed, say 13 miles per hour. The indicated speeds are exemplary only and other speeds may be used, as desired. Thus, it will be appreciated that the principal purpose of the wheel lock detector 90 is to maintain production of a pressure dump, which ordinarily would have been initiated by one of the deceleration summing circuits 39, 49 in response to excessive combined deceleration of the wheels monitored thereby, after the magnitude of that combined deceleration has decreased but while at least one of those monitored wheels is locked up or rotating relatively slowly compared to the speed(s) of the other monitored wheel(s).

Turning now to FIG. 2 again, the wheel lock detector circuit 90 includes an enabling operational amplifier 92 and a threshold operational amplifier 93. When the enabling amplifier 92 is producing a positive voltage at its output, the threshold amplifier 93 is effectively enabled; and when the enabling amplifier 92 does not produce such positive voltage, the threshold amplifier and, thus, the entire wheel lock detector circuit, will be effectively disabled.

A bias voltage is supplied to the inverting input of the enabling amplifier 92 from the regulated $V_{cc}$ terminal 84 of the power supply 82, which is coupled across the terminal 94 and ground terminal 61, via a resistive network 95 and a diode 96. A pull-up resistor 97 is connected between an output 98 of the enabling amplifier 92 and the diode 96. An OR gate 99, including diodes 100-103, provides on line 104, which is coupled to the non-inverting input of the enabling amplifier 92, a DC voltage of a magnitude that is approximately equal to the largest of the DC voltages on lines 37, 38, 50, 51, whereby such DC voltage represents the speed of the fastest rotating wheel and, thus, usually the actual speed of the vehicle. When the magnitude of the DC voltage level on line 104 represents a wheel speed exceeding about 13 miles per hour, for example, the enabling amplifier 92 will produce a positive voltage on its output 98 to enable the threshold amplifier 93. A lock memory 105 included in the wheel lock detector 90 has a resistor 106 and a capacitor 107 coupled between the line 104 and the ground terminal 61 to assure that the magnitude of the DC voltage level on line 104 will not change instantaneously although all four wheels monitored by the tandem control brake system 1 may simultaneously lock up.

A NAND gate 108 including diodes 109-112, provides on line 113 another DC voltage level that is approximately equal to the smallest one of the DC voltages on lines 37, 38, 50, 51, thus representing the most slowly rotating wheel, which ordinarily may be one that first locks. The bias voltage effectively provided to the inverting input of the threshold amplifier 93 via the resistive network 114 will effectively be clamped relative to the DC voltage level on line 113 at the output of the NAND gate 108. When the enabling amplifier 92 is not producing a positive enabling voltage at its output 98, the output 115 from the threshold amplifier 93 will be a relatively low or negative voltage, which ordinarily will pass through isolating diode 116 to line 91; therefore, no wheel lock signal is produced. However, the magnitudes of the resistances in the network 114 and the internal biases in the threshold amplifier 93 itself preferably are selected such that when the enabling amplifier 92 produces a positive enabling voltage on its output 98 a DC voltage level on line 113 representing a wheel speed exceeding 8 miles per hour will assure that the threshold amplifier 93 will continue to produce its relatively low or negative output signal on its output 115. Moreover, while the threshold amplifier 93 is so enabled, when the DC voltage level on line 113 drops below that representing a minimum wheel speed of 8 miles per hour, the threshold amplifier 93 will produce a positive voltage on its output 115; and this positive voltage passes the diode 116 and is applied as the wheel locked signal via line 91 to the comparator 28 in the control portion 26 to effect production of a dump signal. It will be appreciated that such wheel locked signal and dump signal ordinarily will continue to be produced until either the magnitude of the DC voltage level on line 113 exceeds effectively 8 miles per hour or the DC voltage level on line 104 has dropped below a magnitude representing effectively 13 miles per hour, whereupon enabling amplifier 92 would disable the threshold amplifier.

It has been found that without the enabling-disabling function of the enabling amplifier 92 in the wheel lock detector 90, electrical noise in the tandem control brake system 1 possibly could cause the wheel lock detector incorrectly to produce a wheel locked signal. Ordinarily, though, the occurrence of a locked wheel condition when a vehicle is moving at less than 13 miles per hour is unlikely. Therefore, the wheel lock detector is self-disabled when the vehicle is moving below that speed.

However, it is possible that a sudden, i.e. a rapid or non-gradual, deceleration of a predetermined magnitude may occur even when the vehicle is moving below 13 miles per hour during which time the enabling amplifier 92 ordinarily would have been disabled. Such sudden deceleration of predetermined magnitude may indicate an undesirable locked wheel condition. It is the purpose of the low speed control circuit 120, which is coupled to the output line 113 of the NAND gate 108, to recognize such sudden, relatively excessive deceleration and to produce in response thereto a voltage at its output 121 that effectively raises the magnitude of the DC voltage level on line 104 stored in the lock memory circuit 105 an amount proportional to such sudden deceleration. By thusly increasing the magnitude of the DC voltage level on line 104, the enabling amplifier 92 again is temporarily enabled to allow the threshold amplifier 93 to produce the wheel locked signal on line 91 for a duration depending on the time required for the lock memory circuit 105 to discharge the DC voltage level on line 104 to a value below 13 miles per hour. Such discharge time depends on the magnitude of the sudden deceleration detected by the low speed control circuit 120. Accordingly, the low speed control circuit 120 is a differentiating circuit that includes an operational amplifier 122, a differentiating capacitor 123, an input resistor 124, a feedback resistor 125, and a feedback capacitor 126. The output voltage produced by the amplifier 122 on its output 127 is attenuated by a resistance and diode network 128 and provided as the low speed control signal voltage on line 121 to the wheel lock detector 90.

In view of the foregoing, it will be appreciated that the tandem control brake system 1 is operative to dump a percentage of the air pressure requested by the vehicle operator when the combined deceleration of the wheels on one of two tandem axles is excessive or exceeds a predetermined magnitude. Moreover, a single wheel lock detector circuit 90 continuously monitors all of the vehicle wheels and upon detecting a locking of any one of those wheels produces a wheel locked signal that causes a pressure dump. The wheel lock detector includes an enabling-disabling circuit for noise immunity at low speeds, and a single low speed control circuit monitors the wheel speeds and re-enables the wheel lock detector upon detecting a sudden deceleration of a predetermined magnitude even while the vehicle is moving relatively slowly. Thus, the tandem control brake system 1 provides relatively improved braking efficiency even when split mu conditions are encountered, provides a locked wheel detecting function and a low speed control function, all with a minimum of circuitry. Additionally, only a single air brake valve and minimum electrical connections and plumbing associated therewith are required in the tandem control brake system 1 to provide the anti-skid brake control function for all of the tandem wheels monitored by the system 1.

The embodiments of the invention in which an exclusive property or privilege is claimed are defined as follows:

1. In an anti-skid brake control system for overriding manual operation of the brakes of a vehicle having plural wheels on each of plural axles, including transducer means for monitoring the speeds of such plural wheels, and output means responsive to the wheel speeds detected by the transducer means for controllably dumping a percentage of the brake operating fluid pressure requested by the vehicle operator, the improvement comprising:

a single wheel lock detector circuit means coupled between the transducer means and the output means for detecting the locking of any of the monitored wheels to operate the output means to effect such overriding in response to detection of such wheel locking, said wheel lock detector circuit means including disabling means for ordinarily disabling said wheel lock detector means when the vehicle speed drops below a predetermined minimum speed and threshold amplifier means for producing a wheel lock signal to effect such overriding when the speed of any of the monitored wheels drop below a predetermined minimum speed and said disabling means has not disabled said wheel lock detector circuit means, and further comprising NAND gate means for coupling the transducer means to said wheel lock detector circuit means, whereby the latter is responsive to the locking of the most slowly rotating one of the plural wheels monitored.

2. In an anti-skid brake control system for overriding manual operation of the brakes of a vehicle having plural wheels on each of plural axles, including transducer means for monitoring the speeds of such plural wheels, output means responsive to the wheel speeds detected by the transducer means for controllably dumping a percentage of the brake operating fluid pressure requested by the vehicle operator, and wheel lock detector circuit means coupled between the transducer means and the output means for detecting the locking of any of the monitored wheels to operate the output means to effect such overriding in response to detection of such wheel locking, the improvement comprising: disabling means for disabling the wheel lock detector means when the vehicle speed is below a predetermined speed, and low speed control means responsive to sudden deceleration of at least one of the plural wheels when the vehicle speed is below such predetermined speed for re-enabling the wheel lock detector means for a duration proportional to the magnitude of such sudden deceleration.

3. The improvement of claim 2, wherein said low speed control means comprises a differentiator circuit for producing an output signal having a magnitude that is proportionally representative of the magnitude of such sudden deceleration.

4. An anti-skid brake control system for overriding manual operation of the brakes of a vehicle having plural wheels on each of plural axles, comprising first detector means for detecting the combined decelerations of the plural wheels on one of the axles, second detector means for detecting the combined decelerations of the plural wheels on another of the axles, and control means for initiating such overriding in response to detection of a predetermined combined deceleration by at least one of said detector means, and wherein each of said detector means produces a respective deceleration signal having respective magnitudes representative of the combined decelerations of the plural wheels on the respective axles, and further comprising OR gate means for passing the larger of such deceleration signals to said control means.

5. The system of claim 4, further comprising single wheel lock detector means for detecting a locked condition of any one of said plural wheels, and means for operatively coupling said wheel lock detector means to said control means to cause the latter to effect such overriding when a locked condition of at least one wheel has been detected.

6. The system of claim 5, wherein said wheel lock detector means includes disabling means for disabling the same when the vehicle speed is below a predetermined speed.

7. The system of claim 4, wherein the plural axles are tandem axles of the vehicle, wherein the plural wheels on respective axles are located, respectively, on both sides of the vehicle, and wherein said first and said second detector means monitor the combined decelerations of the plural wheels on an axle by axle basis.

8. An anti-skid brake control system for overriding manual operation of the brakes of a vehicle having plural wheels on each of plural axles, comprising first detector means for detecting the combined decelerations of the plural wheels on one of the axles, second detector means for detecting the combined decelerations of the plural wheels on another of the axles, and control means for initiating such overriding in response to detection of a predetermined combined deceleration by at least one of said detector means, further comprising single wheel lock detector means for detecting a locked condition of any one of said plural wheels, and means for operatively coupling said wheel lock detector means to said control means to cause the latter to effect such overriding when a locked condition of at least one wheel has been detected, said wheel lock detector means including disabling means for disabling the same when the vehicle speed is below a predetermined speed, and further comprising low speed control means responsive to sudden deceleration of at least one of the plural wheels when the vehicle speed is below such predetermined speed for re-enabling said wheel lock detector means for a duration proportional to the magnitude of such sudden deceleration.

9. The system of claim 8, wherein said control means comprises single air brake valve means for dumping simultaneously a percentage of the brake operating fluid pressure requested by the vehicle operator for delivery to the brakes of all of such plural wheels on such plural axles.

10. The system of claim 9, wherein said control means comprises comparator means for initiating such overriding when the combined decelerations detected by one of said first and second detector means exceeds a predetermined magnitude.

11. In an anti-skid brake control system for overriding manual operation of the brakes of a vehicle having plural wheels on each of plural axles, including transducer means for monitoring the speeds of such plural wheels, and output means responsive to the wheel speeds detected by the transducer means for controllably dumping a percentage of the brake operating fluid pressure requested by the vehicle operator, the improvement comprising:

a single wheel lock detector circuit means coupled between the transducer means and the output means for detecting the locking of any of the monitored wheels to operate the output means to effect such overriding in response to detection of such wheel locking, said wheel lock detector circuit means includes disabling means for ordinarily disabling said wheel lock detector means when the vehicle speed drops below a predetermined minimum speed and threshold amplifier means for producing a wheel lock signal to effect such overriding when the speed of any of the monitored wheels drops below a predetermined minimum speed and said disabling means has not disabled said wheel lock detector circuit means, and further comprising low speed control means responsive to sudden deceleration of at least one of the plural wheels when the vehicle speed is below such predetermined speed for re-enabling said wheel lock detector means for a duration proportional to the magnitude of such sudden deceleration.

12. The improvement of claim 11, further comprising OR gate means for coupling the transducer means to deliver to said disabling means a signal ordinarily approximately representative of the actual vehicle speed.

13. The improvement of claim 12, wherein said wheel lock detector circuit means further includes memory means for maintaining said wheel lock detector means enabled for a time period if the speeds of all the monitored wheels substantially instantaneously drop below such first mentioned predetermined minimum speed.

14. The improvement of claim 11, further comprising NAND gate means for coupling the transducer means to said wheel lock detector circuit means, whereby the latter is responsive to the locking of the most slowly rotating one of the plural wheels monitored.

15. An anti-skid brake control system for overriding manual operation of the brakes of a vehicle having plural wheels on each of plural axles, comprising first detector means for detecting the combined decelerations of the plural wheels on one of the axles; second detector means for detecting the combined decelerations of the plural wheels on another of the axles; and control means for initiating such overriding in response to detection of a predetermined combined deceleration by at least one of said detector means, each of said detector means respectively including means for producing respective substantially DC signals representative of the speeds of respective wheels, means for simultaneously independently differentiating such DC signals to produce differentiated signals, and means for combining the differentiated signals to produce a deceleration signal having a magnitude representative of the combined decelerations of the plural wheels on each respective axle, said means for combining comprising an amplifier and said means for simultaneously independently differentiating comprising a plurality of series resistor and capacitor circuits coupled to respective ones of said means for producing and to said amplifier to provide to the latter combined signals representative of the differentials of such DC signals, and a feedback resistor coupled between an output and an input of said amplifier, whereby each of said amplifiers produces at its output a deceleration signal having a magnitude proportionately representative of the combined decelerations of the plural wheels on each respective axle, and further comprising OR gate means for passing the larger of such deceleration signals to said control means.

* * * * *